(12) United States Patent
Kim

(10) Patent No.: US 10,436,177 B2
(45) Date of Patent: Oct. 8, 2019

(54) YAW BRAKE SYSTEM

(71) Applicant: DOOSAN HEAVY INDUSTRIES & CONSTRUCTION CO., LTD., Gyeongsangnam-do (KR)

(72) Inventor: Seong Hyeon Kim, Gyeonggi-do (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 576 days.

(21) Appl. No.: 15/227,777

(22) Filed: Aug. 3, 2016

(65) Prior Publication Data

US 2017/0159643 A1 Jun. 8, 2017

(30) Foreign Application Priority Data

Dec. 7, 2015 (KR) .......................... 10-2015-0173189

(51) Int. Cl.
*F03D 7/02* (2006.01)
*F03D 13/20* (2016.01)
(Continued)

(52) U.S. Cl.
CPC ......... *F03D 7/0244* (2013.01); *F03D 7/0204* (2013.01); *F03D 13/20* (2016.05);
(Continued)

(58) Field of Classification Search
CPC .... F03D 7/0244; F16D 55/38; F05B 2260/90; F05B 2260/902
See application file for complete search history.

(56) References Cited

U.S. PATENT DOCUMENTS 7,213,688 B2 * 5/2007 Hendrich ................ B60T 1/065
188/71.5
2010/0038192 A1 * 2/2010 Culbertson ........... F03D 7/0204
188/73.31
(Continued)

FOREIGN PATENT DOCUMENTS

JP 2006-515919 A 6/2006
KR 10-2004-0034683 A 4/2004
(Continued)

OTHER PUBLICATIONS

Office Action issued in corresponding Korean Patent Application No. 10-2015-0173189, dated Aug. 26, 2016, 5 pages.

*Primary Examiner* — Richard A Edgar
*Assistant Examiner* — Brian O Peters
(74) *Attorney, Agent, or Firm* — INVENSTONE Patent, LLC

(57) ABSTRACT

Disclosed herein is a yaw brake system including a multi-disk member disposed in an upper portion of a tower frame of wind generator and including at least two disks, and a braking member disposed in a lower end of a nacelle frame of the wind generator, and provided to brake yawing of a nacelle by interlocking with the multi-disk member. In accordance with the disclosure, it is possible to prepare for buildup of equipment, such as a blade, a hub, or a nacelle, depending on an increase in power of wind power generation, and at the same time to more effectively brake yawing of the nacelle due to a rapid change in wind direction while overcoming a limited space in the nacelle.

16 Claims, 8 Drawing Sheets

(51) Int. Cl.
   *F03D 80/70*   (2016.01)
   *F16D 55/38*   (2006.01)
(52) U.S. Cl.
   CPC ............. *F03D 80/70* (2016.05); *F16D 55/38* (2013.01); *F05B 2260/90* (2013.01); *F05B 2260/902* (2013.01); *Y02E 10/723* (2013.01)

(56) References Cited

U.S. PATENT DOCUMENTS

2014/0133983 A1\* 5/2014 Canedo Pardo ...... F03D 7/0244
    416/9
2014/0367967 A1\* 12/2014 Ossyra ................. F03D 7/0248
    290/44

FOREIGN PATENT DOCUMENTS

| KR | 10-1368655 B1 | 3/2014 |
| KR | 10-2015-0123414 A | 11/2015 |
| WO | 2011/095655 A1 | 11/2011 |

\* cited by examiner

YAW BRAKE SYSTEM

CROSS-REFERENCE(S) TO RELATED APPLICATIONS

This application claims priority to Korean Patent Application No. 10-2015-0173189, filed on Dec. 7, 2015, the disclosure of which is incorporated herein by reference in its entirety.

BACKGROUND

Exemplary embodiments of the present disclosure relate to a yaw brake system, and more particularly, to a yaw brake system capable of preparing for buildup of equipment, such as a blade, a hub, or a nacelle, depending on an increase in power of wind power generation, and at the same time capable of more effectively braking yawing of the nacelle due to a rapid change in wind direction.

A wind generator like a wind turbine is an environmentally-friendly power plant that converts rotational energy generated by wind into electric energy and is a part of new renewable energy businesses that have been spotlighted recently as the need to protect the earth's environment is getting more important.

Such wind generator may be classified into a nacelle and a tower. The nacelle includes a plurality of blades, a hub, a rotor, a generator, a variety of sensors, a yaw brake, etc.

The blades are integrally coupled at predetermined intervals in a circumferential direction about the hub. The center of the hub is connected to a drive shaft of the rotor, and the drive shaft is connected to the generator.

When the blades are rotated by wind, the hub mounted with the blades rotates together, and the drive shaft of the rotor thus rotates to drive the generator. As a result, rotational energy by wind is converted into electric energy. This electric energy is transferred to a power system via the interior of the tower through power cables connected to the generator.

Meanwhile, the wind generator is designed to always generate maximum power in such a manner that the nacelle rotates corresponding to a change in wind direction during "yawing". This system is referred to as a "yaw system".

Referring to FIG. 1, a yaw system may include a yaw bearing 3 having a rack gear 3a, which is circumferentially disposed in the upper portion of a tower 2, yaw drives 4 mounted in the lower portion of a nacelle 1, each having a pinion gear 4a which is formed at the lower end thereof and engages with the rack gear 3a, and the like.

When the wind direction is changed, the yaw drives 4 yaw along the yaw bearing 3 in order to move a plurality of blades in a windward direction.

However, when the nacelle 1 yaws, in particular when the wind direction is rapidly changed, a very large yaw moment occurs, and a yaw brake 5 is required to brake this yaw moment.

The yaw brake 5 may include a yaw disk 6, a plurality of yaw brake blocks 8, a plurality of friction pads 7, etc. First, the yaw disk 6 has an annular shape and is circumferentially disposed in the upper portion of the tower 2. The yaw brake blocks 8 are arranged in the lower portion of the nacelle 1. In this case, the yaw brake blocks 8 and the yaw drives 4 may be arranged alternately at regular intervals in order to reduce spatial interference therebetween.

The friction pads 7 are mounted on each of the yaw brake blocks 8. The friction pads 7 strongly press the yaw disk 6 by hydraulic pressure supplied thereto, and thus brake yawing.

In this case, the friction pads 7 are always in contact with the yaw disk 6, unlike the case of typical braking, thereby restricting a yaw moment value varying according to the yawing of the nacelle 1. When the excessive yawing of the nacelle 1 occurs due to a rapid change in wind direction, the friction pads 7 more strongly press against the yaw disk 6 by hydraulic pressure additionally supplied thereto, and thus brake extreme yawing.

In recent years, wind generator has gradually become larger due to an increasing need for wind power generation and an increase in power, and the sizes of the blades and the nacelle 1 thus tend to increase.

Accordingly, a larger braking force is desirable to control yawing since a yaw moment value is increased along with the yawing of the nacelle 1 as the weight of the nacelle 1 is increased. However, the yaw brake 5 has a limit in coping with such variation, and it is difficult to constitute a separate brake in the nacelle 1 due to a limited space therein.

BRIEF SUMMARY

An object of the present disclosure is to provide a yaw brake system capable of preparing for buildup of equipment, such as a blade, a hub, or a nacelle, depending on an increase in power of wind power generation, and at the same time capable of more effectively braking yawing of the nacelle due to a rapid change in wind direction while overcoming a limited space in the nacelle.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the apparatus and methods as claimed and combinations thereof In accordance with an aspect of the present disclosure, a yaw brake system includes a multi-disk member disposed in an upper portion of a tower frame of wind generator and including at least two disks, and a braking member disposed in a lower end of a nacelle frame of the wind generator, and provided to brake yawing of a nacelle by interlocking with the multi-disk member.

The multi-disk member may include an annular support part disposed between the upper portion of the tower frame and a yaw bearing engaging with a yaw drive mounted to the nacelle frame, the support part having a plurality of through-holes which are circumferentially formed, a first annular disk disposed along an inner peripheral surface of the support part and provided to interlock with the braking member, and a second annular disk disposed along an inner peripheral surface of an extension part protruding downward from the support part, and provided to interlock with the braking member.

An annular groove part may be formed at least one of between the support part and the first disk and between the extension part and the second disk.

The braking member may hydraulically interlock with the multi-disk member, and brake the yawing of the nacelle.

The braking member may include a braking block connected to a lower portion of the nacelle frame, and consisting of three unit blocks, a first braking unit formed between two unit blocks constituting an upper portion of the braking block, and interlocking with the first disk, and a second braking unit formed between two unit blocks constituting a lower portion of the braking block, and interlocking with the second disk.

The first braking unit may include a pair of first pressure spaces formed in the upper portion of the braking block, friction pads disposed in the first pressure spaces so as to face the first disk, and a first hydraulic control line connected to the first pressure spaces, and configured to control hydraulic pressures applied to the first pressure spaces.

The second braking unit may include a pair of second pressure spaces formed in the lower portion of the braking block, friction pads disposed in the second pressure spaces so as to face the second disk, and a second hydraulic control line connected to the second pressure spaces, and configured to control hydraulic pressure applied to the second pressure spaces.

The yaw brake system may further include an acceleration measurement part configured to measure an acceleration change value of the yawing of the nacelle, and a controller configured to calculate a brake torque value required to control the yawing of the nacelle, based on the acceleration change value received from the acceleration measurement part, and to transmit a signal indicative of the value to the first and second braking units.

The first and second disks may have different sizes.

A width between outer and inner peripheral surfaces of the first disk may be greater than a width between outer and inner peripheral surfaces of the second disk.

At least one of the first and second disks may be inclined toward an inner peripheral surface thereof from an outer peripheral surface thereof At least one surface of the braking block may be tapered such that foreign substances are removed from the multi-disk during braking of the yawing of the nacelle.

At least one of the first pressure spaces and the friction pads, and the second pressure spaces and the friction pads may have the same inclination so as to correspond to the inclination of the first or second disk.

When the first and second disks are identically inclined toward the inner peripheral surfaces thereof from the outer peripheral surfaces thereof, the braking block may have the same inclination.

When the first braking unit serves as a main brake and the second braking unit serves as an auxiliary brake, the second braking unit may be operated when brake torque equal to or greater than a predetermined certain value is required.

Different hydraulic pressures may be supplied to the first and second braking units.

When the first braking unit serves as a main brake and the second braking unit serves as an auxiliary brake, the hydraulic pressure supplied to the first braking unit may be larger than the hydraulic pressure supplied to the second braking unit.

When the first braking unit serves as a main brake and the second braking unit serves as an auxiliary brake, the second braking unit may be operated when the first braking unit malfunctions or is repaired.

The first and second braking units may be operated alternately based on a predetermined regular cycle.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
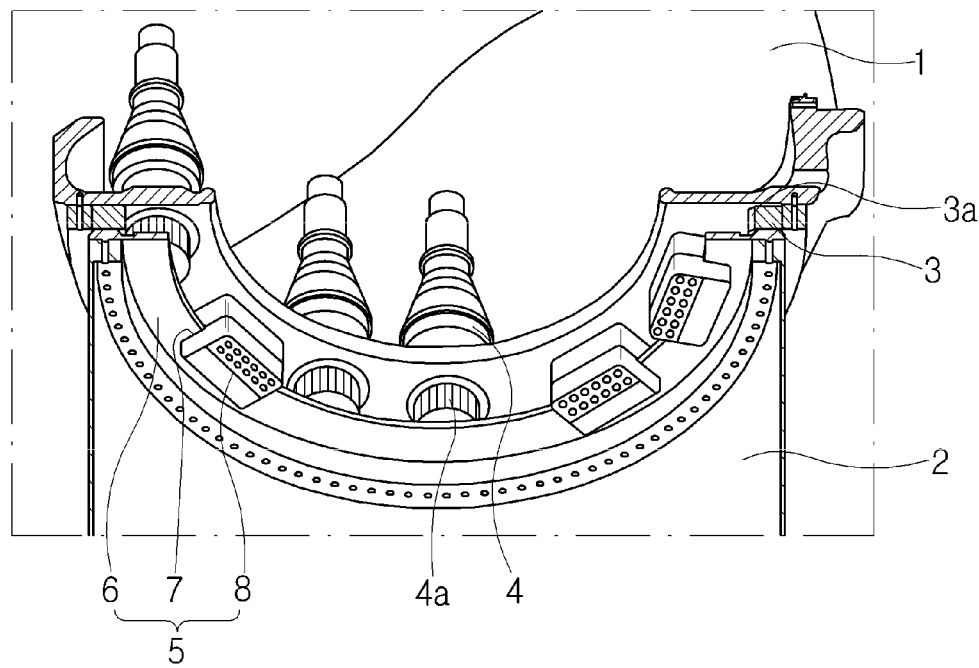
FIG. 1 is a view illustrating a yaw brake system.

It is to be understood that both the foregoing general description and the following detailed description of the present invention are exemplary and explanatory and are intended to provide further explanation of the invention as claimed.

Reference will now be made in detail to the exemplary embodiments of the present disclosure, examples of which are illustrated in the accompanying drawings. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. Hereinafter, a yaw brake system according to exemplary embodiments of the present disclosure will be described in more detail with reference to the accompanying drawings.

Figure 2:
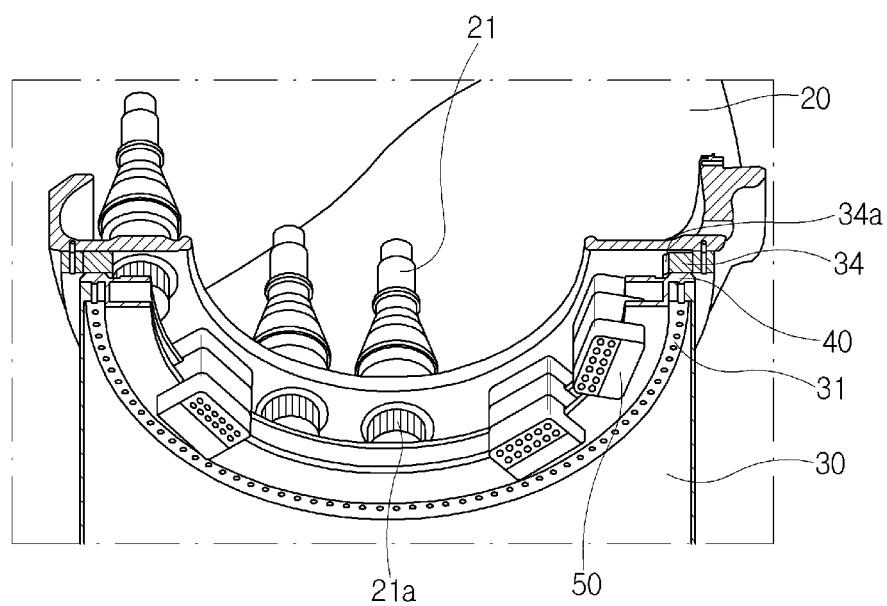
FIG. 2 is a partial perspective cross-sectional view illustrating a yaw brake system according to an embodiment of the present disclosure.
Figure 3:
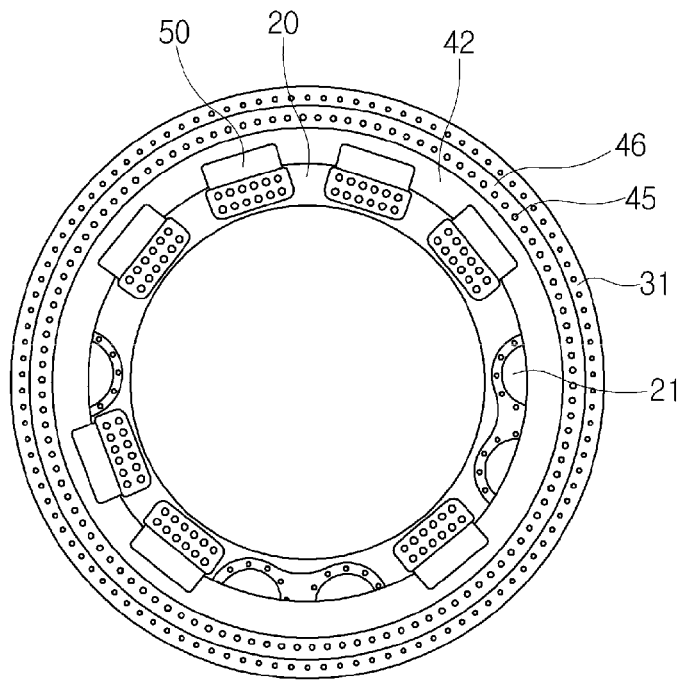
FIG. 3 is a bottom view of the yaw brake system illustrated in FIG. 2.
Figure 4:
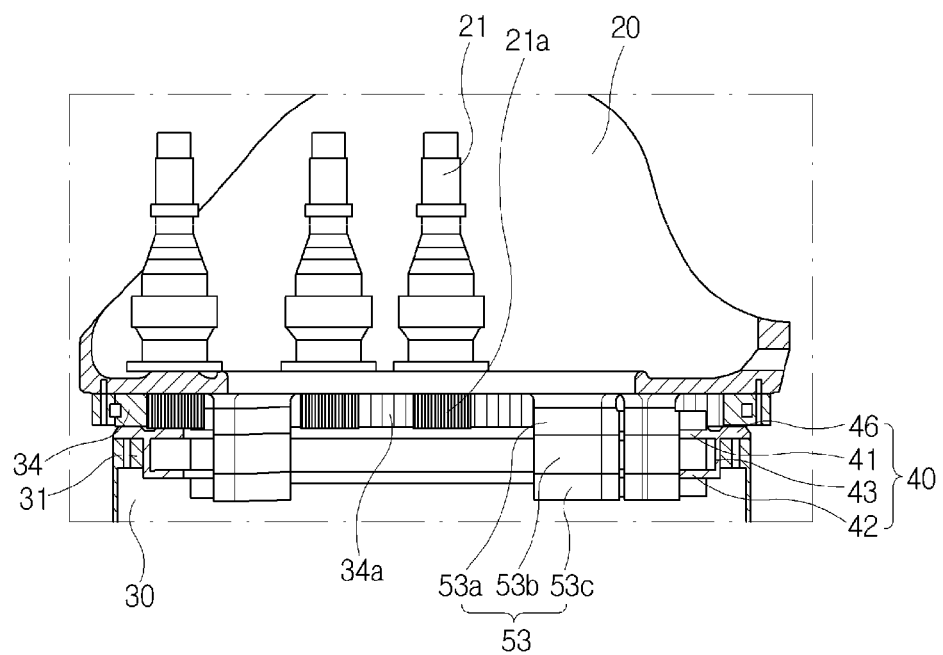
FIG. 4 is a side cross-sectional view of the yaw brake system illustrated in FIG. 2.
Figure 5:
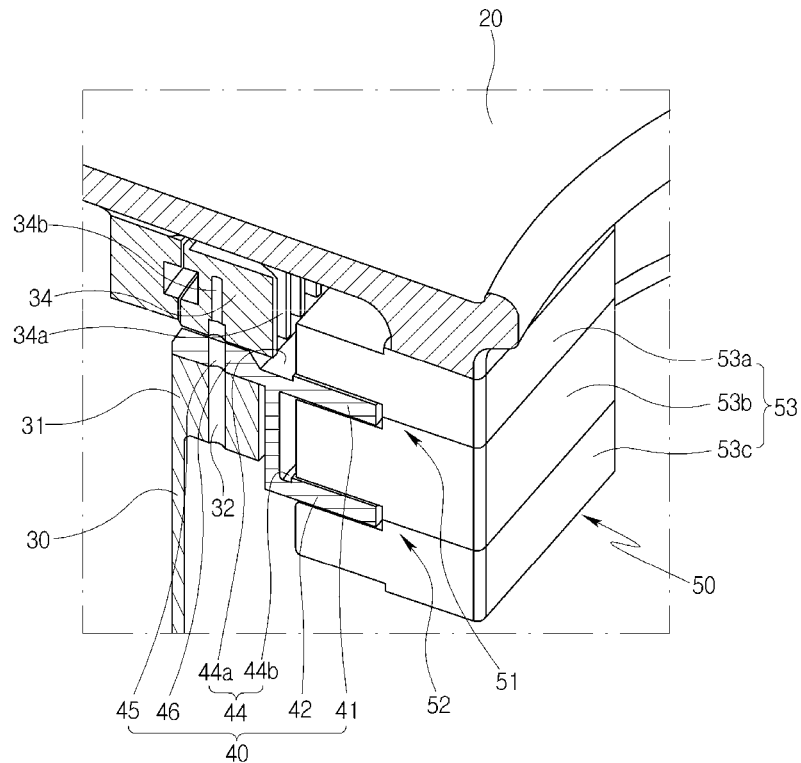
FIG. 5 is a partial perspective cross-sectional view of the yaw brake system illustrated in FIG. 2.
Figure 6:
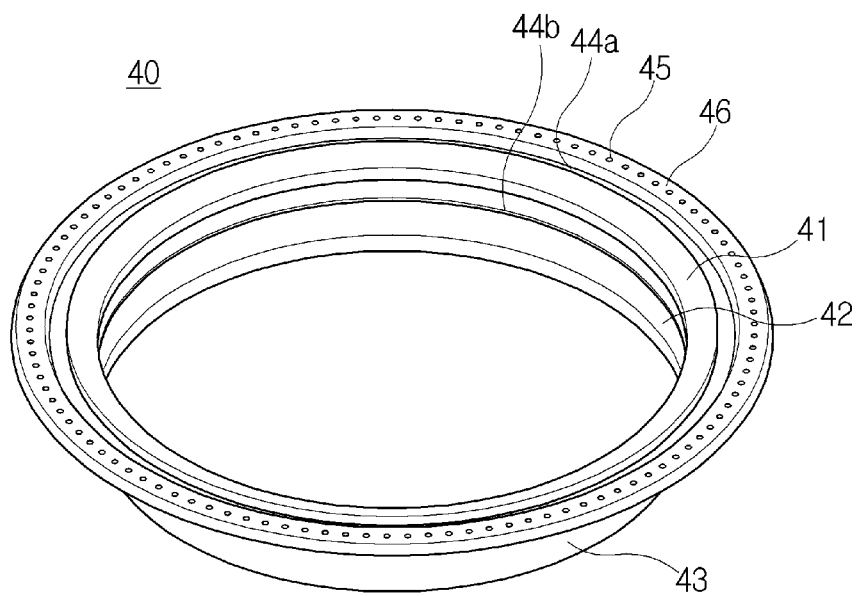
FIG. 6 is a perspective view illustrating a multi-disk member according to the embodiment of the present disclosure.
Figure 7A:
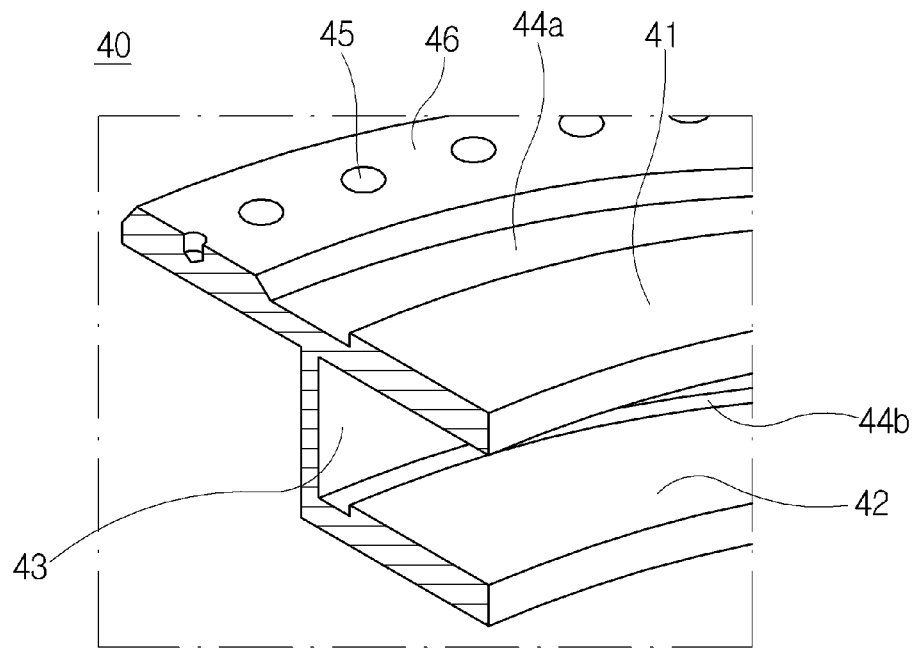
FIG. 7A is a partial perspective cross-sectional view illustrating an example of the multi-disk member illustrated in FIG. 6.
Figure 7B:
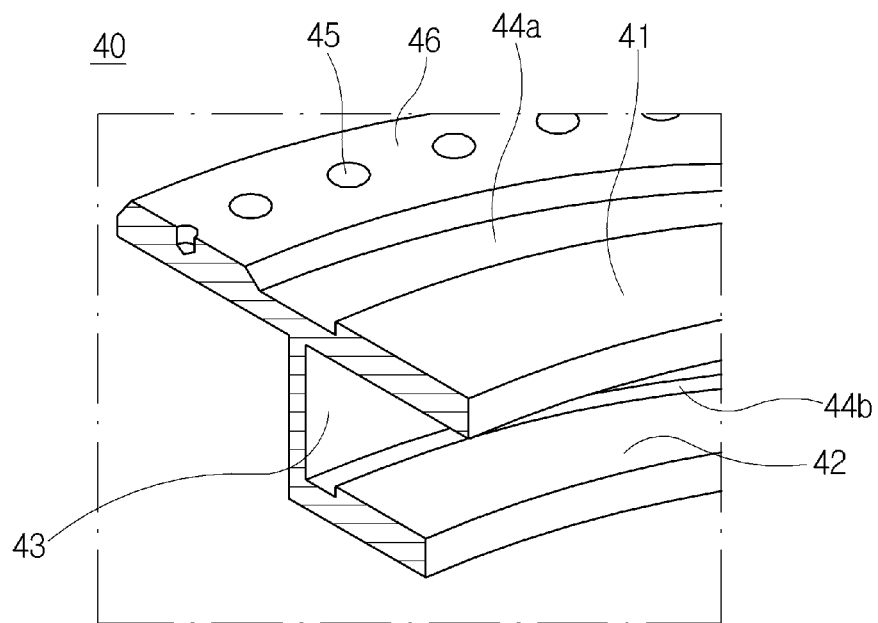
FIG. 7B is a partial perspective cross-sectional view illustrating another example of the multi-disk member illustrated in FIG. 6.
Figure 8:
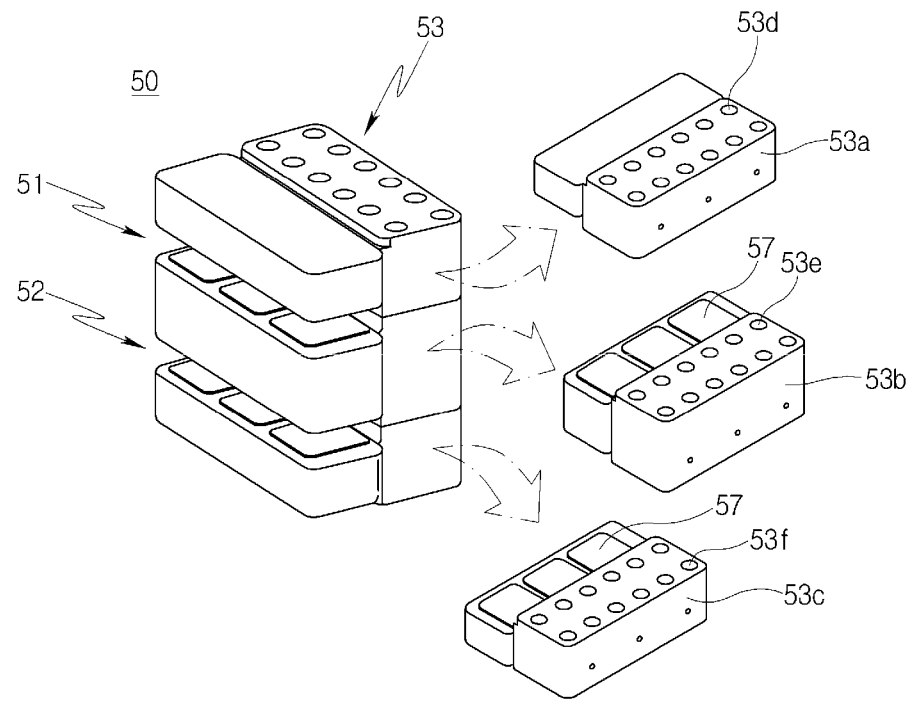
FIG. 8 is a perspective view illustrating a braking member according to the embodiment of the present disclosure.

FIG. 2 is a partial perspective cross-sectional view illustrating a yaw brake system according to an embodiment of the present disclosure. FIG. 3 is a bottom view of the yaw brake system illustrated in FIG. 2. FIG. 4 is a side cross-sectional view of the yaw brake system illustrated in FIG. 2. FIG. 5 is a partial perspective cross-sectional view of the yaw brake system illustrated in FIG. 2. FIG. 6 is a perspective view illustrating a multi-disk member according to the embodiment of the present disclosure. FIG. 7A is a partial perspective cross-sectional view illustrating an example of the multi-disk member illustrated in FIG. 6. FIG. 7B is a partial perspective cross-sectional view illustrating another example of the multi-disk member illustrated in FIG. 6. FIG. 8 is a perspective view illustrating a braking member according to the embodiment of the present disclosure. FIG.

9A is an operation state view illustrating an example of the braking member illustrated in FIG. 8. FIG. 9B is an operation state view illustrating another example of the braking member illustrated in FIG. 8.

Referring to FIGS. 2 to 9B, a yaw brake system according to an embodiment of the present disclosure may include a multi-disk member 40 and a braking member 50.

First, the multi-disk member 40 may be disposed in the upper portion of a tower frame 30 of wind generator. Specifically, referring to FIG. 5, the upper portion of the tower frame 30 has an annular shape, and the tower frame 30 has a protruding part 31 extending inward in a circumferential direction. The protruding part 31 has a plurality of fastening holes 32 arranged therearound. Here, the multi-disk member 40 is seated on the upper end of the protruding part 31 such that the fastening holes 32 coincide with through-holes 45 of the multi-disk member 40, and they are bolted and coupled to each other.

A yaw bearing 34 is disposed in the upper portion of a support part 46 of the multi-disk member 40. The yaw bearing 34 also has an annular shape, and has a plurality of fastening holes 34a which are circumferentially arranged. In this case, the multi-disk member 40 is bolted and coupled to the yaw bearing 34 while the through-holes 45 are positioned corresponding to the fastening holes 34b of the yaw bearing 34.

Referring to FIG. 4, the yaw bearing 34 has a rack gear 34a formed on the inner peripheral surface thereof, and the rack gear 34a engages with a pinion gear 21a formed in the lower portion of a yaw drive 21. A nacelle 20 yaws while the yaw drive 21 moves along the yaw bearing 34.

Here, the multi-disk member 40 has an annular shape corresponding to the shapes of the upper portion of the tower frame 30 and the yaw bearing 34, and may consist of a plurality of disks including at least two disks. In the embodiment of the present invention, the multi-disk member 40 may be embodied as a two-stage disk.

Of course, the multi-disk member 40 may be embodied as a two-stage or more disk according to the operating environment of wind generator.

The multi-disk member 40 according to the embodiment of the present disclosure may include a support part 46, a first disk 41, a second disk 42, and an extension part 43.

First, the support part 46 may be seated on the protruding part 31 of the tower frame 30, as described above. As illustrated in FIG. 6, the support part 46 has the through-holes 45 which are circumferentially formed so as to correspond to the fastening holes 32 formed in the protruding part 31, and is seated on the protruding part 31 such that these holes coincide with each other. The yaw bearing 34 is seated on the support part 46 such that the fastening holes 34b of the yaw bearing 34 coincide with the through-holes 45 of the support part 46. Subsequently, a worker bolts and fixes the multi-disk member 40 to the upper portion of the tower frame 30.

The first disk 41 may be circumferentially disposed inside the support part 46, and extend toward the center thereof. The first disk 41 serves as a friction brake by interlocking with a first braking unit 51 of the braking member 50.

The extension part 43 may be formed in the lower side of the support part 46 while extending downward. The second disk 42 may be disposed perpendicular to the lower end of the extension part 43 so as to extend circumferentially toward the center thereof. The second disk 42 also serves as a friction brake by interlocking with a second braking unit 52 of the braking member 50.

As illustrated in FIGS. 6 and 7A, a first groove part 44a may be formed between the support part 46 and the first disk 41, and a second groove part 44b may be formed between the extension part 43 and the second disk 42.

Both of the first and second groove parts 44a and 44b may be omitted as needed, or only one of the first and second groove parts 44a and 44b may also be formed.

Each groove part 44 may be utilized as a space for removal of foreign substances which may be generated during friction brake between the first and second disks 41 and 42 and the braking member 50. That is, foreign substances generated due to abrasion of friction pads 57 on the first or second disk 41 or 42 are pushed outward by a braking block 53 of the braking member 50 during braking, and are then introduced into each groove part 44.

Accordingly, it is possible to prevent a reduction in braking force which may be caused due to the foreign substances remaining on the first and second disks 41 and 42. In addition, it is possible to prevent damage to the friction surface between the first and second disks 41 and 42 and the friction pads 57 of the braking member 50.

Next, the braking member 50 may be disposed in the lower portion of the nacelle frame 20 of the wind generator, and may be provided to brake the yawing of the nacelle 20 by interlocking with the multi-disk member 40. Specifically, referring to FIG. 3, the braking member 50 may consist of a plurality of braking members arranged at predetermined intervals in the lower portion of the nacelle frame 20.

In the embodiment of the present disclosure, the braking member 50 may consist of seven braking members, and the braking members 50 may be circumferentially arranged in the lower portion of the nacelle frame 20. The yaw drive 21 may consist of five yaw drives, and the yaw drives 21 may be arranged between the braking members. The pinion gear 21a is formed on the lower end of each of the yaw drives 21, and engages with the rack gear 34a of the yaw bearing 34. That is, the yaw drives 21 facilitate the smooth yawing of the nacelle frame 20 by mutual action with the yaw bearing 34, and at the same time the braking members 50 brake the yawing of the nacelle frame 20 by mutual action with the multi-disk member 40.

In this case, the braking members 50 and the yaw drives 21 may be arranged alternately at regular intervals in order to overcome spatial constraints. Here, the numbers of braking members and yaw drives may be appropriately selected according to the size of wind generator and operating environments such as space capacity, power capability, wind intensity, and rapid change in wind direction.

Each of the braking members 50 may include a plurality of braking units so as to correspond to a plurality of disks of the multi-disk member 40. The respective braking units may be configured to hydraulically brake the respective disks of the multi-disk member 40. In the embodiment of the present disclosure, since the multi-disk member 40 includes the first disk 41 and the second disk 42, the braking member 50 may include a first braking unit 51 interlocked with the first disk 41 and a second braking unit 52 interlocked with the second disk 42.

Figure 9A:
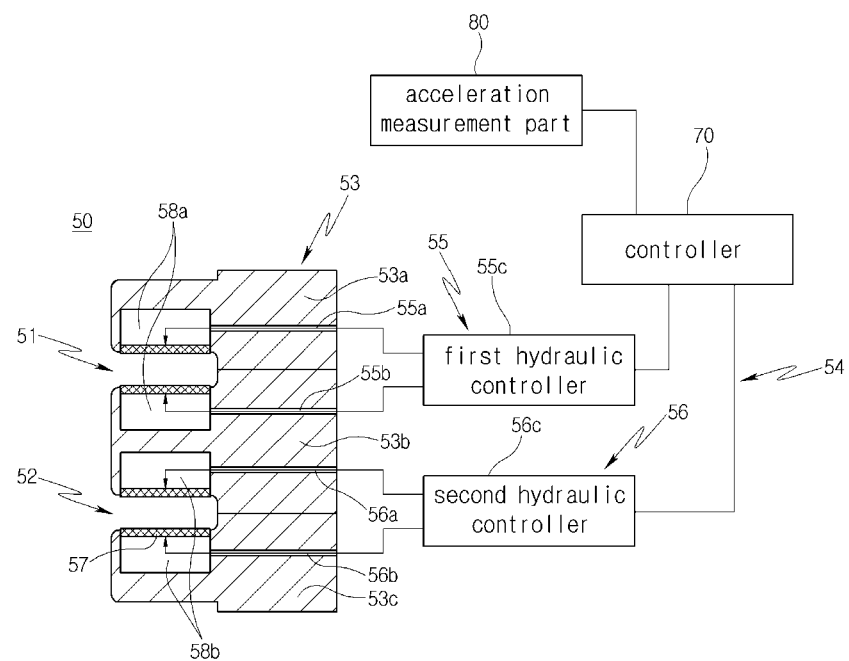
FIG. 9A is an operation state view illustrating an example of the braking member illustrated in FIG. 8.
Figure 9B:
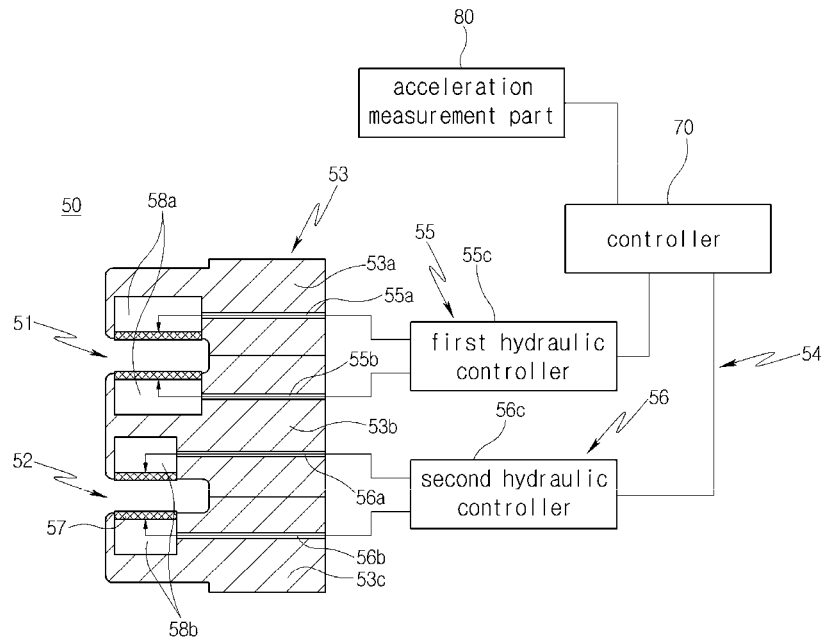
FIG. 9B is an operation state view illustrating another example of the braking member illustrated in FIG. 8.

Referring to FIGS. 8 and 9A, the braking member 50 according to the embodiment of the present disclosure may include a braking block 53 and the first and second braking units 51 and 52.

First, the braking block 53 is connected to the lower portion of the nacelle frame 20, and may consist of three unit blocks. A first unit 53a has a plurality of fastening holes 53d so as to be connected to the lower portion of the nacelle frame 20, and second and third blocks 53b and 53c have respective fastening holes 53e and 53f so as to be connected to the first block 53a.

The first braking unit 51 is formed between two blocks constituting the upper portion of the braking block 53, i.e. the first and second blocks 53a and 53b, and interlocks with the first disk 41.

In addition, the second braking unit 52 is formed between two blocks constituting the lower portion of the braking block 53, i.e. the second and third blocks 53b and 53c, and interlocks with the second disk 42.

Here, the first braking unit 51 may include first pressure spaces 58a, friction pads 57, and a first hydraulic control line 55. The first pressure spaces 58a may be formed in the upper portion of the braking block 53, i.e. between the first block 53a and the second block 53b.

Referring to FIG. 9a, it can be seen that the first pressure spaces 58a are formed between the first block 53a and the second block 53b, and the friction pads 57 are disposed in the respective first pressure spaces 58a to face the first disk 41.

The first hydraulic control line 55 is connected to the first pressure spaces 58a, and may be provided to control hydraulic pressure applied to the first pressure spaces 58a. Hydraulic holes 55a and 55b connected with the first pressure spaces 58a are formed in the first and second blocks 53a and 53b, respectively, and are connected to a first hydraulic controller 55c. The first hydraulic controller 55c may be connected to a controller 70. The controller 70 may be connected to an acceleration measurement part 80 which measures a change in acceleration to the yawing of the nacelle 20.

Both of the acceleration measurement part 80 and the controller 70 may be omitted as needed, or only one of the acceleration measurement part 80 and the controller 70 may be provided.

Next, the second braking unit 52 may include second pressure spaces 58b, friction pads 57, and a second hydraulic control line 56. The second pressure spaces 58b may be formed in the lower portion of the braking block 53, i.e. between the second block 53b and the third block 53c.

Referring to FIG. 9a, the second pressure spaces 58b are formed between the second block 53b and the third block 53c, and the friction pads 57 are disposed in the respective second pressure spaces 58b to face the second disk 42.

The second hydraulic control line 56 is connected to the second pressure spaces 58b, and may be provided to control hydraulic pressure applied to the second pressure spaces 58b. Hydraulic holes 56a and 56b connected with the second pressure space 58b are formed in the second and third blocks 53b and 53c, respectively, and are connected to a second hydraulic controller 56c. The second hydraulic controller 56c is connected to the controller 70.

When hydraulic pressure is supplied to the first and second pressure spaces 58a and 58b through the first and second hydraulic control line 55 and 56, the friction pad 57 disposed on one surface in each of the first and second pressure spaces 58a and 58b expands or moves toward the multi-disk member 40 so as to increase braking force.

Here, the braking method in the nacelle 20 of the wind generator differs from a typical braking method.

In the typical braking method, the rotation of a brake disk is stopped using frictional force when the brake disk comes into close contact with a brake pad in the state in which the brake disk is separated from the brake pad, thereby braking devices connected to the brake disk.

On the other hand, in the braking method in the nacelle 20 of the wind generator, a contact state between a yaw brake disk and a yaw brake block is always maintained. This is to ensure that the yawing of the nacelle 20 does not vary depending to a change in wind direction.

Accordingly, this contact state is maintained as usual, and the yaw brake system is operated when a rapid change in wind direction occurs, in order to prevent devices from being damaged due to the extreme yawing of the nacelle 20. For example, when the maximum yaw braking force is set to be 100, the yaw brake system allows a braking force to be usually maintained in the range of 20 to 30 so as to relieve the yawing of the nacelle 20, and increases a yaw braking force, when a rapid change in wind direction occurs, in order to prevent the extreme yawing of the nacelle 20.

Owing to such braking characteristics, the first and second hydraulic control lines 55 and 56 may be operated individually as needed, or different hydraulic pressures may be supplied to the first and second braking units 51 and 52.

For example, when the first braking unit 51 interlocked with the first disk 41 is designated as a main braking part, and the second braking unit 52 interlocked with the second disk 42 is designated as an auxiliary braking part, the yaw brake system may be operated such that a relatively high hydraulic pressure is supplied to the first hydraulic control line 55 interlocked with the first disk 41, and a relative low hydraulic pressure is supplied to the second hydraulic control line 56 interlocked with the second disk 42.

For another example, the yaw brake system may be operated such that only the first braking unit 51 interlocked with the first disk 41 is usually used, and the second braking unit 52 interlocked with the second disk 42 is additionally used only when the extreme yawing of the nacelle 20 occurs due to a rapid change in wind direction and a larger braking force is thus required. In this case, the yaw brake system may allow the second hydraulic control line 56 to be operated when requiring brake torque equal to or greater than a predetermined brake torque value.

Referring to FIG. 9a, the acceleration measurement part 80 measures an acceleration change value of the yawing of the nacelle 20 depending on a rapid change in wind direction, and the measured value is transmitted to the controller 70. The controller 70 converts the acceleration change value and calculate a brake torque value required to control the yawing of the nacelle 20. Subsequently, the controller 70 transmits signals to the first and second braking unit 51 and 52 when both are operated, so as to increase the hydraulic pressure supplied to the first and second hydraulic control line 55 and 56, or transmits a signal to the second hydraulic control line 56, which is not operated, when only the first braking unit 51 is operated, so as to brake the rotation of the nacelle 20 by the hydraulic pressure supplied thereto.

Of course, the controller 70 converts the required brake torque value into a hydraulic value and transmits a signal indicative of the same to the first and second hydraulic control lines 55 and 56 of the first and second braking units 51 and 52.

For another example, it may be considered that only the first braking unit 51 interlocked with the first disk 41 is usually used, and the first braking unit 51 and the second braking unit 52 interlocked with the second disk 42 are used alternately in the event of malfunction, failure, repair, replacement, or emergency. This is to prevent a power generation vacuum when the first braking unit 51 is abnormal.

For a further example, it may be considered that the first and second braking units 51 and 52 are used alternately on a regular cycle. In this case, a user may preset an alternate cycle so as to be suitable for the operating environment of wind generator, thereby enabling extension of the service life and replacement cycle of components.

The above operation methods can help to increase a braking force, extend the service life and replacement cycle of components, reduce costs, prevent a power generation vacuum, etc. in the wind generator.

Of course, the yaw brake system may set both of the first and second braking units 51 and 52 as main braking parts, and allow the same hydraulic pressure to be supplied thereto. This may be selected appropriately according to operating environments.

Referring to FIGS. 7B and 9B, in another example of the present disclosure, the multi-disk member 40 may be configured to include first and second disks 41 and 42 having different sizes. In addition, the braking member 50 may be configured to include first and second pressure spaces having different sizes and friction pads 57 so as to correspond to the first and second disks 41 and 42 having different sizes.

As a result, main braking may be generated between the first disk 41 and the first braking unit 51, and auxiliary braking may be generated between the second disk 42 and the second braking unit 52.

That is, since the first braking unit 51 serves as a main brake to be used usually and continuously, it is possible to supply a larger hydraulic pressure. In addition, since the second braking unit 52 serves as an auxiliary brake, it is accessorily operated when requiring large brake torque due to the failure, repair, or the like of the first braking unit 51, or a rapid change in wind direction. Therefore, the second pressure spaces 58b may be configured to be relatively smaller than the first pressure spaces 58a, and the friction pads 57 may thus be configured to be relatively smaller. Consequently, it is possible to reduce manufacturing costs.

Figure 10A:
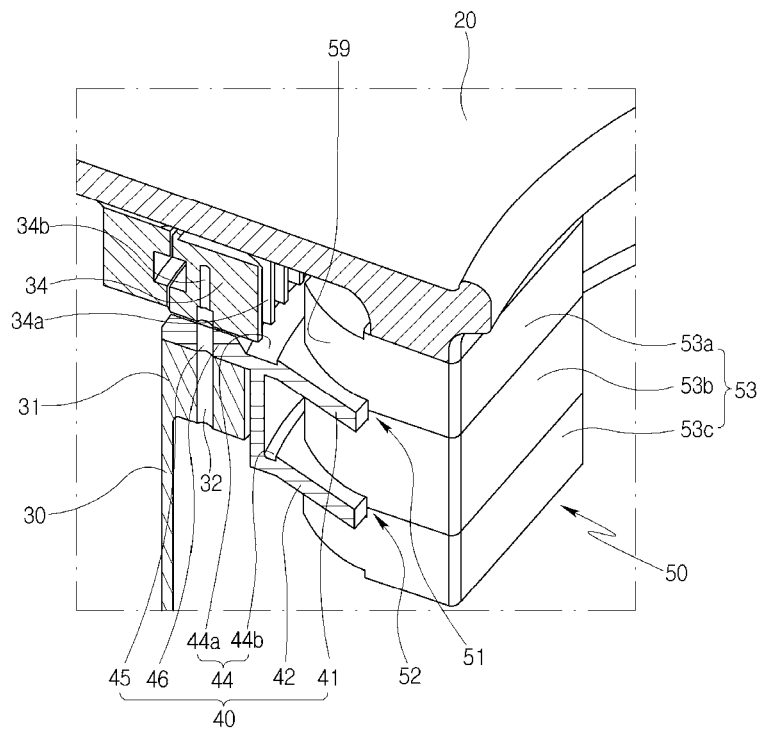
FIGS. 10A, 10B, and 10C are partial cross-sectional views illustrating a yaw brake system according to another embodiment of the present disclosure.
Figure 10B:
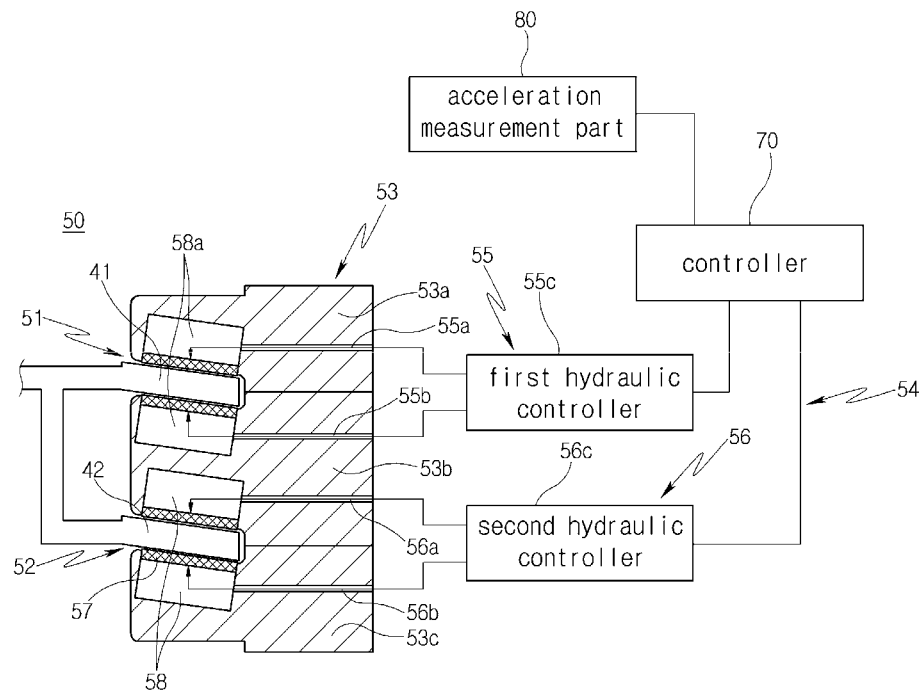
Figure 10C:
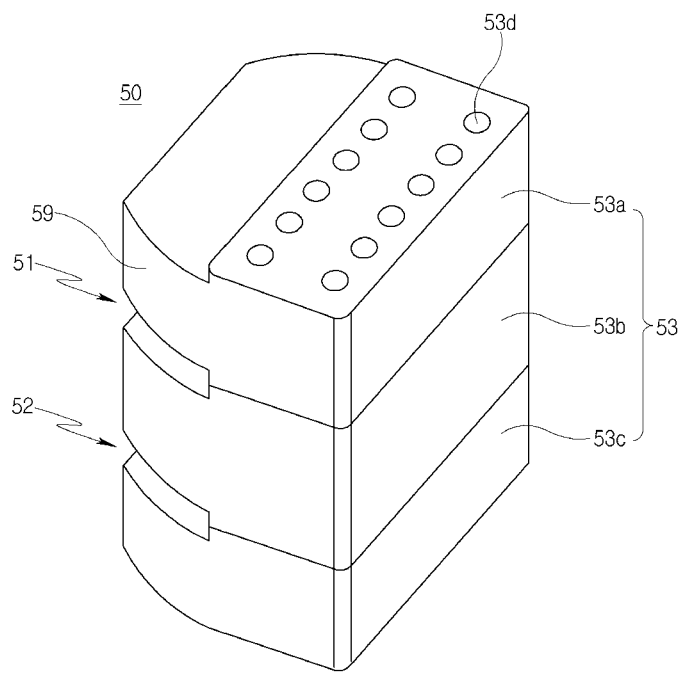

Meanwhile, referring to FIGS. 10A to 10C, a yaw brake system according to another embodiment of the present invention may include a multi-disk member 40 having an annular shape. At least one of first and second disks 41 and 42 of the multi-disk member 40 may be inclined toward the inner peripheral surface thereof from the outer peripheral surface thereof. In addition, at least one surface of a braking block 53 may be tapered.

Alternatively, both of the first and second disks 41 and 42 may be inclined toward the annular center thereof In this case, foreign substances generated during friction brake between the first and second disks 41 and 42 and friction pads 57 drop downward along the inclined surface by gravity to be removed.

In this case, when the at least one surface of the barking block 53 is formed as a tapered part 59, the braking block 53 attached to a nacelle frame 20 serves as a wiper when rotating in one direction thereof, thereby sweeping foreign substances.

In the embodiment of the present disclosure, when both surfaces of the braking block 53 are formed as tapered parts 59, the braking block 53 bilaterally moves on the first and second disks 41 and 42 depending the rotation of the nacelle 20, thereby removing foreign substances.

That is, foreign substances may be effectively removed through the use of gravity and the wiper function. Therefore, it is possible to reduce or prevent the surface damage of the multi-disk member 40 and the malfunction of the friction pads 57 due to foreign substances.

In this case, since the first and second disks 41 and 42 are inclined, the first and second pressure spaces 58a and 58b and the friction pads 57, which are disposed in the braking block 53, may be obliquely formed. This is to reduce of prevent the deterioration of braking capability by securing friction surfaces.

Figure 11A:
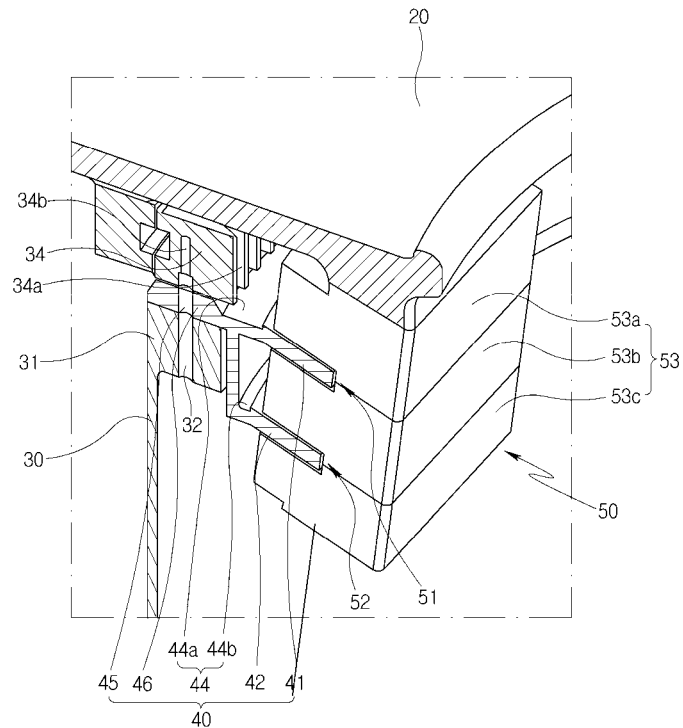
FIGS. 11A and 11B are partial cross-sectional views illustrating a yaw brake system according to a further embodiment of the present disclosure.
Figure 11B:
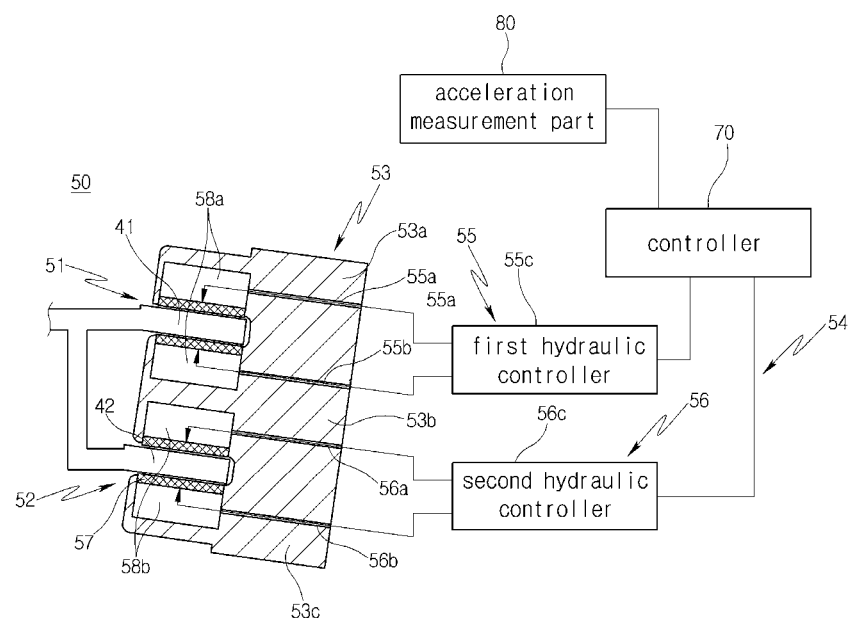

In addition, referring to FIGS. 11A and 11B, a yaw brake system according to a further embodiment of the present disclosure may be configured such that a braking block 53 itself is inclined in proportion to the inclination of a multi-disk member 40. Accordingly, stress applied to the friction surface of the braking block 53 may be minimized and the wear rate of each friction pad 57 may be lowered.

As is apparent from the above description, in accordance with exemplary embodiments of the present disclosure, it is possible to more effectively brake the yawing of a nacelle by including a plurality of yaw braking disks and a plurality of yaw braking pads to brake the respective disks.

In addition, it is possible to overcome a limited space in the nacelle and simultaneously exhibit an improved braking effect by constituting an existing yaw brake, which is disposed in the boundary portion of the nacelle and tower of wind generator, in a multistage manner.

Since the yaw braking pads to brake the respective yaw braking disks are individually used, it is possible to use only a portion of the yaw braking pads when a low braking force is required due to a small change in wind direction, and to use a large number of yaw braking pads when a high braking force is required due to a rapid change in wind direction. Thus, the braking force can be controlled corresponding to the yawing of the nacelle varying depending on the change in wind direction, and it is possible to prevent a needless waste of braking force.

Furthermore, since the yaw braking disks are inclined and the yaw braking pads are tapered, foreign substances generated during the friction brake between the yaw braking disks and the yaw braking pads can be removed through dropping by gravity and a wiper function.

Ultimately, it is possible to prepare for buildup of equipment, such as a blade, a hub, or a nacelle, depending on an increase in power of wind power generation, to more effectively brake the yawing of the nacelle due to a rapid change in wind direction, and at the same time to extend the service life of yaw brake components and reduce maintenance costs through the removal of foreign substances.

Through the configuration and operation of the present invention, it is possible to prepare for the buildup of equipment related to the nacelle depending on the increase in power of wind power generation, and at the same time to more effectively brake the yawing of the nacelle due to a rapid change in wind direction.

While the present invention has been described with respect to the specific embodiments, it will be apparent to those skilled in the art that various changes and modifications may be made without departing from the spirit and scope of the invention as defined in the following claims.

The breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A yaw brake system, comprising:
a multi-disk member disposed in an upper portion of a tower frame of a wind generator, the multi-disk member including a first annular disk and a second annular disk; and a braking member disposed in a lower portion of a nacelle frame of the wind generator, the braking member operable to brake yawing of a nacelle by interlocking with the multi-disk member, wherein the braking member includes a first braking unit and a second braking unit, wherein the first braking unit comprises: a pair of first pressure spaces defined in the upper portion of a braking block; a first plurality of friction pads disposed in the first pressure spaces so as to face the first annular disk; and a first hydraulic control line coupled to the first pressure spaces and operable to control hydraulic pressure applied to the first pressure spaces, and the second braking unit comprises: a pair of second pressure spaces defined in the lower portion of the braking block; a second plurality of friction pads disposed in the second pressure spaces so as to face the second annular disk; and a second hydraulic control line coupled to the second pressure spaces and operable to control hydraulic pressure applied to the second pressure spaces.

2. The yaw brake system according to claim 1, wherein the multi-disk member comprises:
an annular support disposed between the upper portion of the tower frame and a yaw bearing engaging with a yaw drive mounted to the nacelle frame, the annular support having a plurality of through-holes defined therein and circumferential arranged about the annular support;
a first annular disk disposed along an inner peripheral surface of the annular support and operable to interlock with the braking member; and
a second annular disk disposed along an inner peripheral surface of an extension protruding downward from the annular support, the second annular disk operable to interlock with the braking member.

3. The yaw brake system according to claim 2, wherein an annular groove is defined at least one of
between the annular support part and the first annular disk or
between the extension and the second annular disk.

4. The yaw brake system according to claim 3, wherein the braking member is operable to hydraulically interlock with the multi-disk member, and to brake the yawing of the nacelle.

5. The yaw brake system according to claim 1, wherein the braking member comprises: the braking block coupled to a lower portion of the nacelle frame, the braking block including at least three unit blocks, wherein the first braking unit is disposed between two of the unit blocks that define an upper portion of the braking block, the first braking unit operable to interlock with the first annular disk, and the second braking unit is disposed between two of the unit blocks that define a lower portion of the braking block, the second braking unit operable to interlock with the second annular disk.

6. The yaw brake system according to claim 1, wherein further comprising: an acceleration measurement sensor operable to measure an acceleration change value of the yawing of the nacelle; and a controller operable to control the yawing of the nacelle based on a brake torque value and the acceleration change value received from the acceleration measurement sensor, convert the brake torque value into a hydraulic value, and transmit a signal indicative of the brake torque value to the first and second braking units.

7. The yaw brake system according to claim 6, wherein the first and second annular disks have different sizes.

8. The yaw brake system according to claim 7, wherein a width between outer and inner peripheral surfaces of the first annular disk is greater than a width between outer and inner peripheral surfaces of the second annular disk.

9. The yaw brake system according to claim 6, wherein at least one of the first and second annular disks is inclined toward an inner peripheral surface thereof from an outer peripheral surface thereof.

10. The yaw brake system according to claim 9, wherein at least one surface of the braking block is tapered.

11. The yaw brake system according to claim 10, wherein at least one of the first pressure spaces and the first plurality of friction pads, and the second pressure spaces and the second plurality of friction pads has a same inclination so as to correspond to the inclination of the respective one of the first or second annular disk.

12. The yaw brake system according to claim 10, wherein the first and second annular disks are each inclined toward the inner peripheral surfaces thereof from the outer peripheral surfaces thereof, the incline of the first annular disk is the same as the incline of the second
annular disk, and the braking block has the same inclination as the first and second annular disks.

13. The yaw brake system according to claim 6, wherein the controller is operable to operate the second braking unit when the brake torque value is equal to or greater than a certain value.

14. The yaw brake system according to claim 6, wherein the controller operable to operate the first and second braking units are alternately on a regular cycle.

15. A yaw brake system, comprising: a multi-disk member disposed in an upper portion of a tower frame of a wind generator, the multi-disk member including a first annular disk and a second annular disk; and a braking member disposed in a lower portion of a nacelle frame of the wind generator, the braking member operable to brake yawing of a nacelle by interlocking with the multi-disk member, wherein the braking member includes a first braking unit and a second braking unit, wherein the first braking unit comprises: a pair of first pressure spaces defined in the upper portion of a braking block; a first plurality of friction pads disposed in the first pressure spaces so as to face the first annular disk; and a first hydraulic control line coupled to the first pressure spaces and operable to control hydraulic pressure applied to the first pressure spaces, and the second braking unit comprises: a pair of second pressure spaces defined in the lower portion of the braking block; a second plurality of friction pads disposed in the second pressure spaces so as to face the second annular disk; and a second hydraulic control line coupled to the second pressure spaces and operable to control hydraulic pressure applied to the second pressure spaces, wherein different hydraulic pressures are supplied to the first and second braking units.

16. The yaw brake system according to claim 15, wherein the hydraulic pressure of the first braking unit is larger than the hydraulic pressure of the second braking unit.

\* \* \* \* \*